June 6, 1967  E. O. DAHL ET AL  3,323,901
PROCESS OF PELLETIZING ORES
Filed March 17, 1965
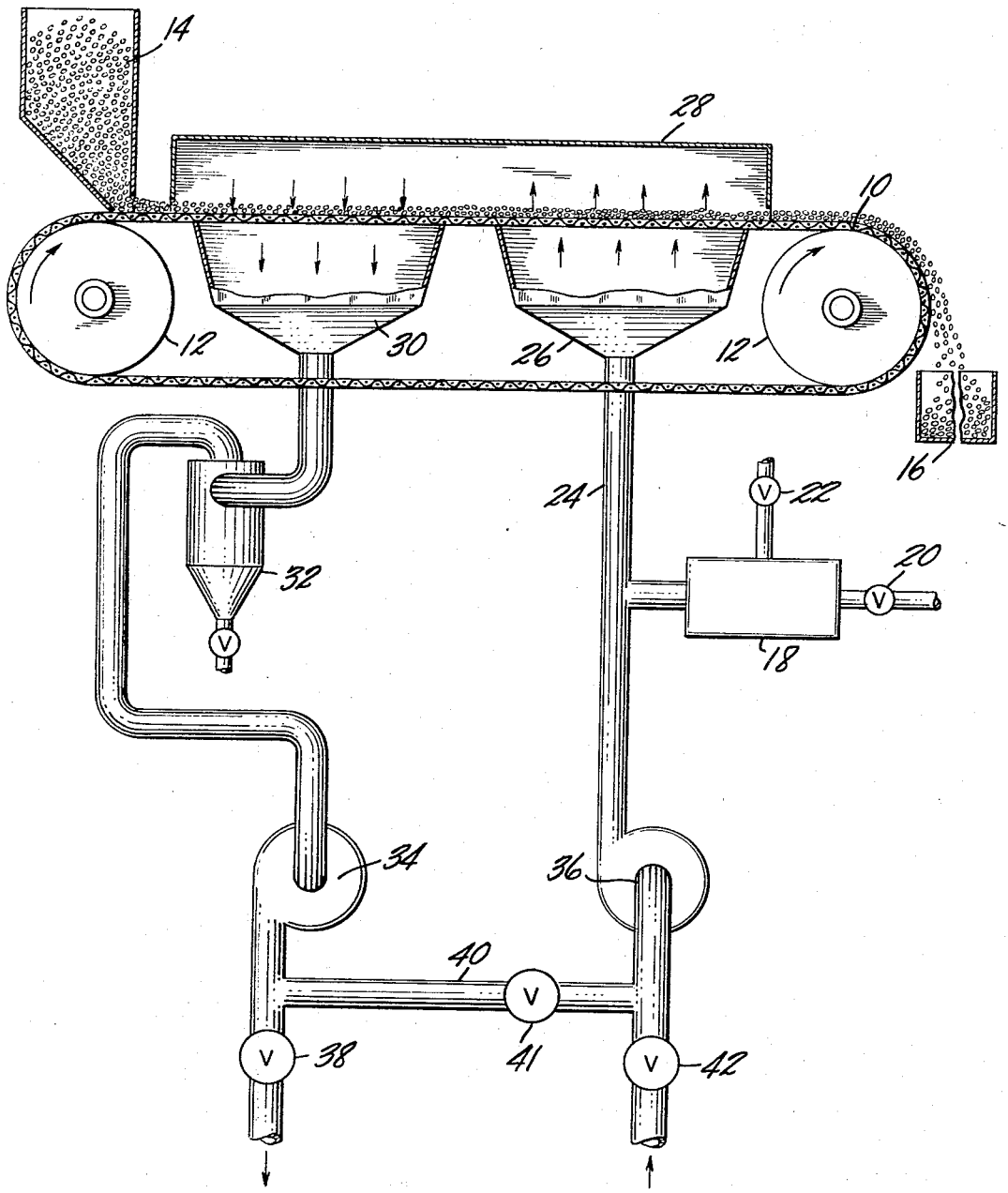
INVENTORS.
ERIK O. DAHL &
TORE F. ANDERSSEN
BY
Eyre, Mann & Lucas
ATTORNEYS.

United States Patent Office 3,323,901
Patented June 6, 1967

3,323,901
PROCESS OF PELLETIZING ORES
Erik Ovale Dahl and Tore Fennefoss Anderssen, Kristiansand, Norway, assignors to Elektrokemish A/S, a corporation of Norway
Filed Mar. 17, 1965, Ser. No. 444,908
5 Claims. (Cl. 75—3)

This application is a continuation-in-part of our copending application Ser. No. 184,868, filed Feb. 28, 1962 now abandoned.

Pellets in the form of molded aggregates of pulverulent metal oxide ores, a carbonaceous reducing agent and binder have heretofore been used in conventional smelting processes employed for reduction of the metal oxide ore. In such processes the mechanical strength of the pellets is a very important factor which contributes to the efficiency of the operation. If mechanical strength is low the pellets will readily break in transit and the greater the breakage the lower the efficiency of the smelting process.

It has now been discovered that when raw wet pellets containing certain specific binders are subjected to a stream of air and dried in two steps under certain prescribed conditions to contain less than about 1% by weight of water, the resulting pellet structure will have materially greater mechanical strength than pellets similarly treated with other binders. The specific binders referred to are sulphite lye and molasses, and the reasons why these two binders, as compared to others, result in superior mechanical strength are not well understood. However, actual tests have proved that the use of sulphite lye and molasses, in the process of this invention, leads to unexpected advantages which are of great value when dried pellets produced according to the invention are used in conventional smelting processes, especially those carried out in an electric furnace.

In carrying out the process of the present invention the raw pellets are molded in conventional equipment as by mixing the ingredients in a concrete mixer and then molded aggregates about 15 to 25 mm. in diameter are formed as in a so called saucer type pelletizer.

The metal oxide ore is in such a finely divided state that at least 50% will pass through a 200 mesh Tyler screen and the remainder through a 30 mesh screen. The size of the particles of the metal oxide ore is an important feature of the present invention which distinguishes it from briquetting processes in which only coarsely crushed lumpy materials are employed to form a molded aggregate with large pore openings therein. As a result of the large pore openings water readily escapes from the interior of the briquettes which are dried and hardened without facing the special problems involved in drying and hardening the pellets of the present invention which have relatively small pore openings from which water can only escape with difficulty. For example, it was found in developing the process of the present invention that pellets containing materials of the above specified size swell up and expand when dried in conventional manner probably because of internal pressures caused by evaporation of water. Any appreciable swelling results in such low mechanical strength that the pellets are unsatisfactory for use in conventional smelting processes.

The present invention is useful in connection with the reduction of oxide ores customarily smelted and reduced with carbonaceous reducing agents as in the manufacture of calcium carbide, ferro-silicon and the like. The process is of particular advantage for smelting and reducing metal oxide ores and especially iron ore.

Any of the conventional carbonaceous reducing agents such as coke, coal, peat, etc. may be employed in the present process for reduction of the ore but the material must be ground fine enough to meet the screen analysis specified hereinabove for the ore. Optimum benefits are realized in accordance with this invention by using finely divided iron ore and bituminous coal. In all cases the ore and coal are combined in the proportions conventionally used and in general the amount of carbonaceous material will be that amount required for reduction of the ore.

As previously noted, only the binders sulphite lye and molasses may be used in molding the pellets in order to achieve the increased mechanical strength that is provided by the invention. Portland and alumina cements and bentonite have been demonstrated by actual test to be unsatisfactory in the process, for reasons which are not clearly understood. The amount of binder employed has a definite influence on the mechanical strength of the finished dried pellets and in accordance with our invention the amount of binder in the raw wet molded aggregate is limited to between about 1% to about 8% by weight of the molded aggregate for best results.

Control of the amount of water in the raw molded aggregate is important in order to produce pellets of good quality. The pores of the pellets should preferably be completely filled by water. The internal vapor pressure thus created during conventional drying processes will, however, cause the pellets to swell and expand. The amount of water employed in the raw materials is dependent on the densities of the raw materials. It should, however, be limited to between about 7 to about 13% by weight of the mix.

The order in which the ingredients are mixed is not important and if dry sulphite lye is employed this may be admixed with the water and the admixture added to the dry ingredients in the mixing equipment. If desired water may be sprayed onto the dry ingredients in the molds of the pelletizing equipment. Other convenient methods for mixing the ingredients may be employed. After the molding operation, the pellets are subjected to a controlled two step drying and heating process in which the raw pellets are hardened to obtain superior mechanical strength in accordance with the invention.

In our work the mechanical strength of the pellets is determined by two tests. In one test the amount of pressure required to crush the pellets is measured and in the second test we measure the height from which the pellets may be dropped onto a hard steel plate without breaking more than 50% of the pellets. The first test for pressure strength is useful for determining the height of charge column which may be employed in the various stages of the smelting process without crushing the pellets, and the drop strength indicates the capability of the pellets to withstand shock as in feeding operations where the pellets may be subjected to free fall as in the charging of the furnace or preheating shafts, etc.

Raw wet freshly molded pellets are held together by the force of the capillary attraction and the mechanical strength of the pellets is so low that they will crush under a pressure of about 3 to 5 kgs. The drop strength of such raw wet pellets is about 150–200 cms. Partly dried pellets are mechanically very weak, having a pressure strength of only about 2 kgs. and a drop strength of about 40 cms. Such low pressure and drop strength is not satisfactory for direct application of the pellets in commercial smelting operations. Drying of pellets containing 3% sulphite lye (1.5% on dry base) as a binder in a stream of air of a temperature of about 120° C. will improve the the pressure strength to about 10 kgs. and give a drop strength of about 60 cms. These values are, however, still too low for use of the pellets in commercial smelting operations.

In accordance with the invention, we have discovered that if the pellets made with sulphite lye or molasses binder are dried in two steps in which the temperature of the drying gas in the first step is up to but not in excess of 90° C. and the temperature of the drying gas in the second step is over 90° C. and up to about 150° C., and the second drying step is continued until the moisture content of the pellets is below 1% by weight, superior mechanical strength may be achieved which permits the pellets to be stored, transported or otherwise handled in conventional smelting with far less problems of breakage or similar damage. For example, pellets produced according to the invention will exhibit on the average a pressure strength above 30 kgs. and a drop strength above 100 cm. Compared to pellets treated in exactly the same manner but made with binders other than sulphite lye or molasses, the above-stated values are about 7.5 and 3 times greater respectively than the average pressure and drop strengths of such other pellets.

In addition to the surprising and unexpected results noted above, it has been also found that even with respect to the useful binder sulphite lye, materially better results are achieved over the temperature range used for two step drying if the drying is carried out in two steps as compared to one step. For example, when pellets with sulphite lye binder have been dried at 70° C. and 140° C. in two steps in accordance with the invention and pellets of the same composition dried to an equivalent degree in one step at a temperature of 120° C. or 150° C., the pressure and drop strengths of the two-step-dried pellets were both more than 3 time greater than the corresponding values for the one-step-dried pellets. Thus, perhaps even more surprisingly, two-step drying is required not only with respect to other binders but also for the two unique binders which have been found to give the unexplainable superior results.

As noted above, the temperature of the drying gas in the first drying step should not exceed 90° C. and, in the second drying step, the temperature of the drying gas may be above 90° C. up to about 150° C. For best results, the first drying step is continued until the original moisture content of the raw pellets has been reduced by at least 50%. More than two drying zones can be used as long as the temperature of the drying gas in the first zone is maintained at 90° C. or below. Best results are also achieved by carrying out the drying operation in such manner as to cause the drying air to pass repeatedly through a moving layer of pellets which may be moved through a drying chamber on a conventional type of conveyor belt made of steel wire net. Recycling the drying air through the pellets in this way reduces the total amount of air required for drying the pellets and the heat content of the air or combustion gas is most efficiently utilized. Any conventional equipment may be employed for conveying the pellets through the drying chamber.

One example of a preferred embodiment of apparatus is schematically illustrated in the drawing.

In the drawing 10 is a conventional conveyor belt of steel wire net which travels over two rotating drums 12 for conveying the pellets which are fed onto the belt from a hopper 14 or an open chute which is not indicated in the drawing. After the pellets have been dried they are collected in an appropriate container as indicated at 16. In actual operation the pellet layer on belt 10 was about 175 mm. high but this height may, of course, be varied to suit the size of the equipment and it may be adjusted to assist in achieving the proper temperatures in the two drying steps. The drying gas is generated in a combustion chamber 18 to which fuel such as oil and air may be supplied through the pipes 20 and 22 respectively. The fuel is burned in conventional manner in the combustion chamber and the combustion gas is thereafter passed through pipe 24 into the larger chamber 26 which distributes the gas so that it will pass upwardly through the layer of pellets on the belt as indicated by the arrows. Thereafter the combustion gas moves through tunnel or chamber 28 to pass downwardly through the pellets at the left hand side of the chamber shown in the drawing. The gas which passes downwardly through the layer of pellets in the first heating and drying zone is at a temperature of not over about 90° C. In this first drying zone the moisture content in the raw wet pellets is reduced by at least about 50% of the initial value. The gas which passes upwardly through the layer of pellets in the second drying zone completes the final drying in which the moisture content of the pellets is reduced to below about 1% by weight. The gas supplied to the pellets in the second drying zone is at a temperature of about 150° C. and the supply of gas and pellets is so adjusted that the gas in passing upwardly through the pellets will be cooled and supplied to the pellets in the first drying zone at a temperature not over about 90° C.

The combustion gas from the first heating and drying zone is collected in chamber 30 and then the gas passes through a standard cyclone 32 which precipitates and removes flue dust from the combustion gas. Circulation of the combustion gas in the system is carried out by means of conventional fans 34 and 36. The combustion gas may be discharged from the system through valve 38 or any desired amount of gas may be recycled back into the system through the pipe 40 in order to assist in regulating the temperature of the air in chamber 26. For the same purpose cold air may be supplied to the system by means of valve 42. The pipe 40 may be equipped with a valve 41.

While drying is carried out in two separate zones in the apparatus shown in the drawing, as noted previously the combustion gas may be repeatedly passed through the layer of pellets on the belt to form three or more separate heating zones but in such case the maximum temperature in the first heating step will still be maintained below about 90° C. and the temperature of the combustion gas in the final drying step is preferably maintained at a temperature not over about 150° C.

The following examples are specific embodiments of the process of the invention and will illustrate further details thereof:

*Example I*

In pilot plant operation finely divided iron ore and bituminous coal having particles 70% of which passed through a 200 mesh Tyler screen and the remainder through a 30 mesh screen were mixed with sulphite lye and water in the following proportions:

| | Parts by weight |
|---|---|
| Magnetite concentrate (from the Syd-Varanger Mine) | 60 |
| Steam coal (Longyear steam coal from Spitzbergen) | 28 |
| Sulphite lye | 3 |
| Water | 9 |

The above ingredients were mixed in a conventional concrete mixer and the mix was then pelletized in a conventional saucer type pelletizer to produce molded aggregates of about 22 mm. in diameter. Thereafter the pellets were fed from the hopper of the apparatus illustrated in the drawing onto the conveyor belt and dried by passing through the two heating zones in the oven. The temperature of the combustion gas in the first heating zone was 85° C. and the temperature of the combustion gas in the second heating zone was 135° C. Fifty percent of the moisture was driven out of the pellets in the first heating zone and the remainder of the moisture was expelled in the final heating step. The pellets delivered to hopper 16 had a moisture content of 0.0% and a pressure strength of 38 kgs. and a drop height of 90 cms. Thereafter the finished pellets were fed into a conventional rotary kiln where they were prereduced in conventional manner by heating to a temperature between about 900° C. and 1000° C. and then the pellets were delievered to a smelting furnace in which the final smelting and reduction practice was carried out. The pellets delivered to the rotary kiln had excellent mechanical strength and few if any were broken in the kiln. Conventionally sintered pellets which were treated in the same way in the prereducing kiln, were strongly desintegrated and gave between 20 and 30% dust (−16 mesh) by weight of the pellets.

*Example II*

Raw green pellets similar to those of Example I were made with various amounts of different binders. The relative proportions of oxide ore and coal were maintained constant while the amount of water was varied within the range 7 to 13% according to the various amounts of binders. The wet green pellets, in each case, were dried in two steps in manner described in Example I except that the temperature of the drying gas in the first step was 70° C. and in the second step 140° C. The pressure and drop strengths of the pellets were determined before and after drying, and the results are given in the following table:

| Binder Amount and Type | Pellet Strength | | | |
|---|---|---|---|---|
| | Wet | | Dry | |
| | Press. (kg.) | Drop (cm.) | Press. (kg.) | Drop (cm.) |
| 5% portland cement | 3.8 | 150 | 1.9 | 20 |
| 3% alumina cement | 3.6 | 145 | 8.2 | 65 |
| 1% bentonite | 4.0 | 140 | 3.7 | 25 |
| 3% molasses | 4.2 | 180 | 30.7 | 105 |
| 1.5% sulphite lye | 4.1 | 175 | 38.5 | 100 |

As will be noted, the use of molasses and sulphite lye as binders unexpectedly resulted in materially greater mechanical strength in the pellets.

*Example III*

In this example, additional pellets containing sulphite lye binder were made according to the composition used in Example II. However, rather than being dried in two steps, the additional pellets were dried in one step at several temperatures. The strength of the pellets before and after drying was as follows:

| | Pellet Strength | | | |
|---|---|---|---|---|
| | Wet | | Dry | |
| | Press. (kg.) | Drop (cm.) | Press. (kg.) | Drop (cm.) |
| Drying Temperature (one step): | | | | |
| 150° C. | 4.1 | 175 | 6.6 | 30 |
| 120° C. | 4.1 | 175 | 10.9 | 60 |
| Dry Temperatures (two step-Ex. II): | | | | |
| 70° C., 140° C. | 4.1 | 175 | 38.5 | 100 |

As will be noted, even with sulphite lye binder, two step drying results in superior mechanical strength as compared to equivalent drying in one step.

It will be understood that the example is given by way of illustration only and many modifications can be made without departing from the spirit and scope of the present invention.

We claim:

1. The method of producing pellets having superior mechanical strength for handling in conventional smelting and reduction processes which comprises the steps of mixing together finely divided metal oxide ore, a carbonaceous reducing agent, from about 1 to about 8% by weight of a binder selected from the group consisting of sulphite lye and molasses, and from about 7 to about 13% by weight of water, forming pellets from the mixture, establishing a layer of the pellets and moving said layer through at least two successive drying zones, passing a stream of hot gas having a temperature up to 90° C. through said layer in the first drying zone and passing a stream of hot gas having a temperature above 90° C. and up to about 150° C. through said layer in the subsequent drying zone until the moisture content of the pellets in said layer is below 1% by weight.

2. The method as in claim 1 wherein the original moisture content of the pellets in said layer is reduced by about 50% in the first drying zone.

3. The method as in claim 1 wherein the gas exiting from the subsequent drying zone is passed through said moving layer of pellets in the first drying zone.

4. The method as in claim 1 wherein the gas exiting from the first drying zone is blended with additional hot gas to raise the temperature of the blend above 90° C. and up to 150° C., and then the hot gas blend is passed through said layer of pellets in the subsequent drying zone.

5. The method as in claim 1 wherein the rate of movement of said layer of pellets and the rate of flow of the hot gas in the subsequent drying zone are so correlated that the temperature of said hot gas, at the time it exits from said subsequent zone, is reduced to 90° C. maximum by means of a controlled heat exchange effected between said gas and said pellets.

No references cited.

BENJAMIN HENKIN, *Primary Examiner.*